United States Patent [19]

Katz et al.

[11] 4,431,368
[45] Feb. 14, 1984

[54] METHOD FOR COUPLING CONTAINERS END TO END

[75] Inventors: Sol Katz, New Hope; Andrew Abolins, Langhorne, both of Pa.

[73] Assignee: Strick Corporation, Fort Washington, Pa.

[21] Appl. No.: 272,876

[22] Filed: Jun. 12, 1981

[51] Int. Cl.³ .............................................. B60P 7/13
[52] U.S. Cl. ................................. 414/786; 280/408; 280/DIG. 8; 410/69; 410/78
[58] Field of Search ................ 414/139, 786; 410/69, 410/77, 78, 82, 83, 84; 280/408, DIG. 8; 24/221 R, 287; 220/1.5, 23.2, 23.4; 294/67 DA, 81 SF

[56] References Cited

U.S. PATENT DOCUMENTS

| | | | |
|---|---|---|---|
| 3,004,772 | 10/1961 | Bohlen et al. | 280/DIG. 8 |
| 3,237,967 | 3/1966 | Anderson | 280/423 R |
| 3,261,070 | 7/1966 | Abolins | 24/221 R |
| 3,317,219 | 5/1967 | Hindin et al. | 280/DIG. 8 |
| 3,363,803 | 1/1968 | Abolins | 410/82 |
| 3,365,229 | 1/1968 | Hitch et al. | 280/DIG. 8 |
| 3,383,005 | 5/1968 | Abolins | 220/23.4 |
| 3,578,374 | 5/1971 | Glassmeyer | 220/23.4 X |
| 3,701,562 | 10/1972 | Carr | 410/82 |

*Primary Examiner*—Leslie J. Paperner
*Attorney, Agent, or Firm*—Seidel, Gonda & Goldhammer

[57] ABSTRACT

Two containers are mounted on telescoping chassis sections and moved toward each other. Mating coupler structure at juxtaposed lower corners of the containers rigidly connect the containers horizontally. At least one spacer member at the juxtaposed upper ends of the containers space the containers from each other. Cables connected to the ends of the coupled containers may be utilized to lift the containers as a unit off the chassis sections for loading into a container ship.

5 Claims, 9 Drawing Figures

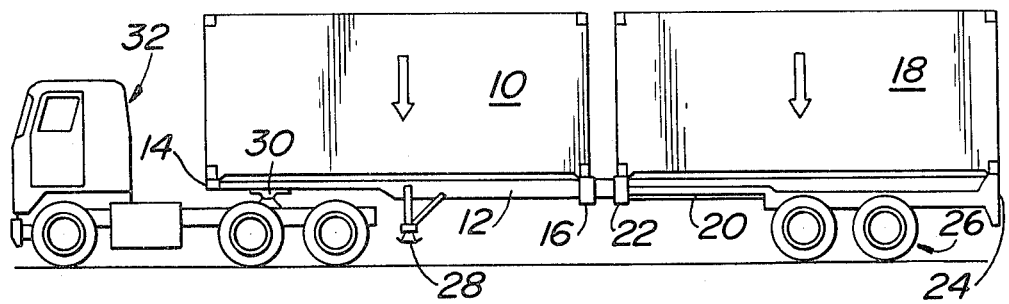
FIG.1
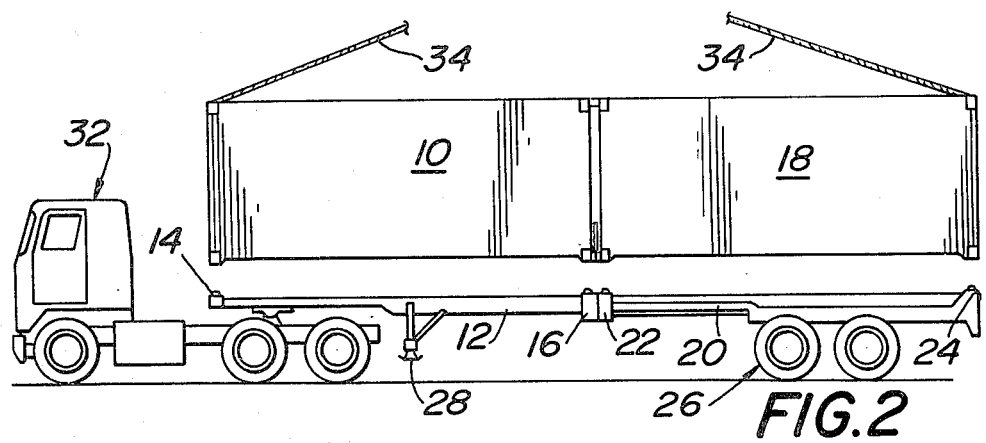
FIG.2
FIG.3
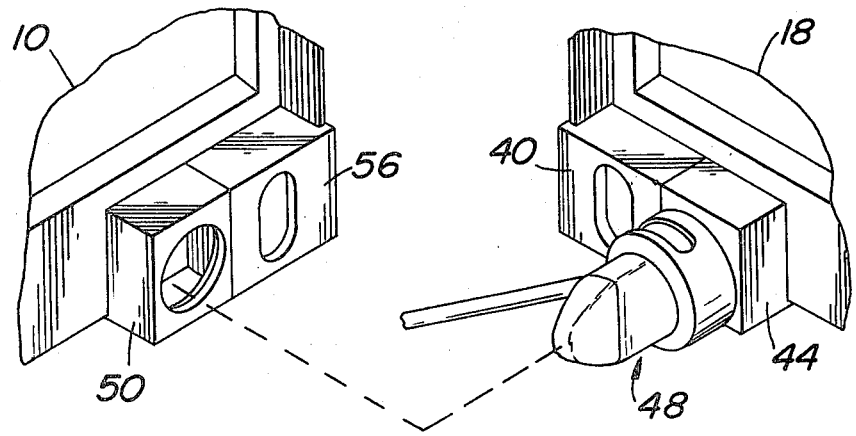

METHOD FOR COUPLING CONTAINERS END TO END

RELATED CASE

Reference is made to a copending application Ser. No. 272,875 filed June 12, 1981 and entitled Apparatus For Coupling Two Containers Together.

BACKGROUND

It is old to couple containers together end to end so that they may be lifted as a unit. It is often desirable to have containers which are 20 foot long for purposes of transporting goods by way of a vehicle driven van. For purposes of transporting containers in a container ship, the apparatus for loading the ship will only handle 40 foot containers. The means utilized heretofore for enabling one container to be coupled to another container has been unsophisticated, slow and unreliable.

See U.S. Pat. No. 3,317,219 wherein one container is stationary and the other container is driven by a tractor until the containers are sufficiently close whereby the containers can be coupled into a single unit. The means disclosed in said patent requires great skill on the part of the driver who is moving the tractor in a reverse direction and whose vision is blocked by the container being moved by the tractor.

The present invention recognizes the problems associated with the prior art such as the teachings of said patent and presents a reliable solution in the form of a method which eliminates the need for skill on the part of the driver.

SUMMARY OF THE INVENTION

The present invention is directed to a system for joining two containers end to end for subsequent movement as a unit. The system includes positioning the containers on first and second telescoping chassis sections which are in an extended position. The containers are provided with mating coupler structure at juxtaposed lower corners and with at least one spacer member at the juxtasposed upper ends of the containers. The first chassis section is moved to a retracted position so that the container thereon moves toward the other container. When the first chassis section is in the retracted position, the upper ends of the containers will be in engagement with the spacer member while the mating structure at the lower corners of the containers engage and rigidly join the lower corners of said containers so that they may be moved as a unit.

It is an object of the present invention to provide a method for coupling ISO standard intermodal containers end to end so that they may be moved as a unit in any manner such as by a lifting crane for stacking and/or loading onto a container ship.

It is another object of the present invention to provide a system of joining containers which requires little or no skill while facilitating joining the containers in a speedy manner.

Other objects will appear hereinafter.

For the purpose of illustrating the invention, there is shown in the drawings a form which is presently preferred; it being understood, however, that this invention is not limited to the precise arrangements and instrumentalities shown.

FIG. 1 is a side elevation view of two containers on telescoping chassis sections in an extended position.

FIG. 2 is a view similar to FIG. 1 with the chassis sections in a retracted position and the containers horizontally connected and being lifted by lifting cables.

FIG. 3 is a partial perspective exploded view of lower corners of two containers.

DETAILED DESCRIPTION

Figure 4:
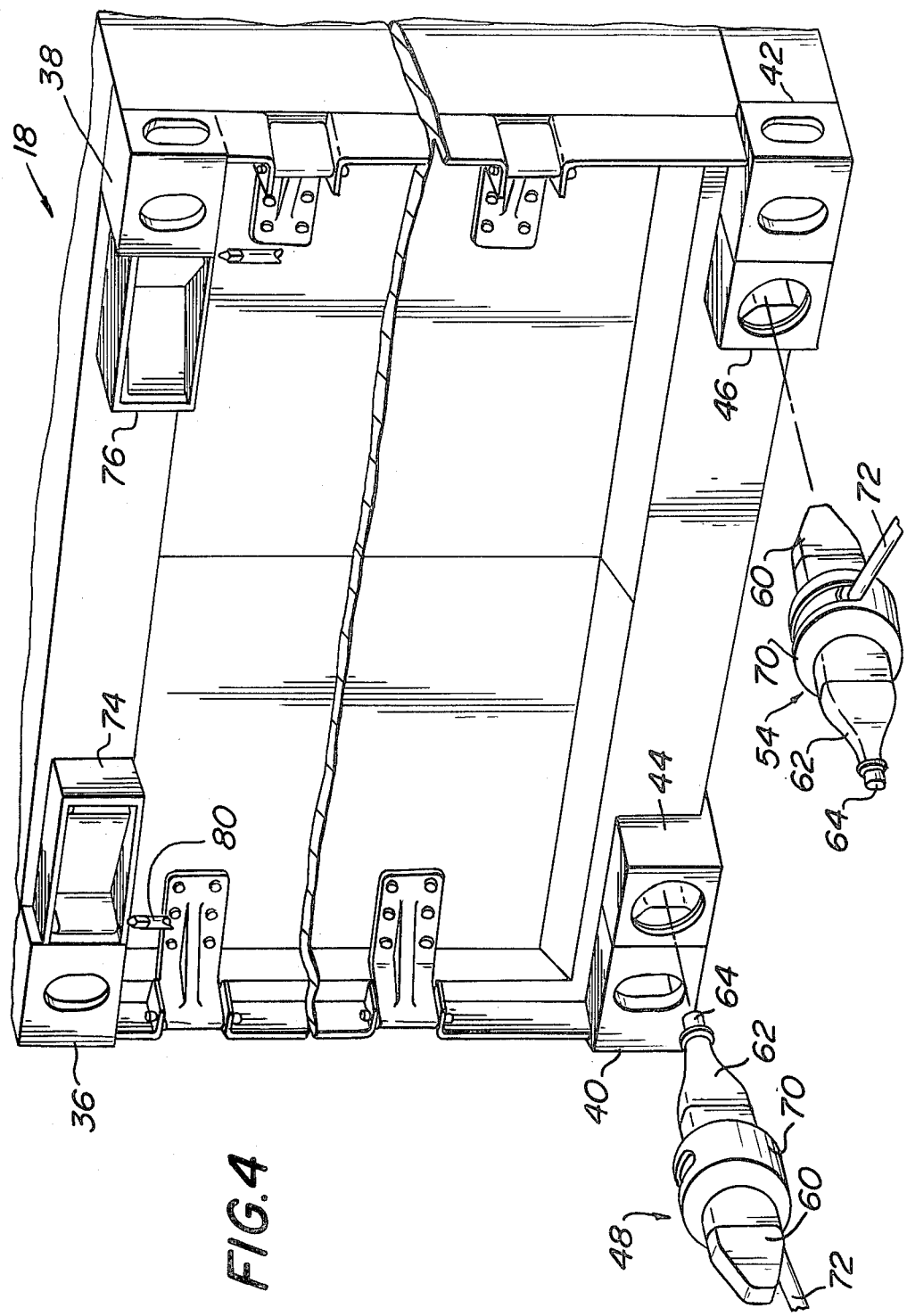
FIG. 4 is a perspective view of one end of one container.

Referring to the drawing in detail, wherein like numerals indicate like elements, there is shown in FIG. 1 apparatus in accordance with the present invention to facilitate rapid coupling of two containers, such as ISO standard containers, end to end. The apparatus includes a first chassis section 12 having bolsters 14 and 16. A container 10 is connected to the chassis section 12 in a vertical direction by locking means on each end of each of the bolsters 14, 16.

The chassis section 12 is telescoped with respect to a second chassis section 20. The chassis section 20 has bolsters 22 and 24 at its ends. A container 18 is coupled to the chassis section 20 in the manner as described above with respect to container 10. In FIG. 1, the chassis sections 12 and 20 are in an extended position. A more detailed description of the telescoping sections is set forth in the above mentioned copending application which is incorporated herein by reference.

Chassis section 12 is preferably provided with support legs 28 while chassis section 20 is preferably provided with a bogie assembly 26. Chassis section 12 is provided with a coupling means 30 for coupling to a motor driven tractor 32. There is thus described a mobile apparatus for transportation over the highway or within an area on a loading dock. The chassis sections 12 and 20 are shown in a retracted position in FIG. 2.

Referring to FIG. 4, the containers such as container 18 are preferably ISO standard containers with upper corner fittings 36, 38 and lower corner fittings 40, 42. It is a feature of the present invention that no changes are made in the structure of such ISO standard intermodal container whereby such containers may be utilized in a normal manner but may also be coupled together end to end in accordance with the system of the present invention.

Adjacent the lower corner fitting 40, there is provided a housing 44 of the same general dimensions with its front face flush with the front face of the corner fitting 40. A similar housing 46 is provided adjacent to the corner fitting 42. See FIG. 4. A similar housing 50 is provided adjacent to the corner fitting 56 at the lower corner of container 10 as shown in FIG. 3. A similar housing 52 is provided adjacent the other corner fitting at the lower end of container 10. The housings 44 and 50 are adapted to cooperate with a coupler member 48 which is adapted to horizontally interconnect the containers 10 and 18 into a rigid unit. A similar coupler member 54 is adapted to interconnect the containers in a rigid unit at an opposite lower corner. Coupler members 48 and 54 are identical. Hence, only coupler member 48 will be described in detail.

Figure 7:
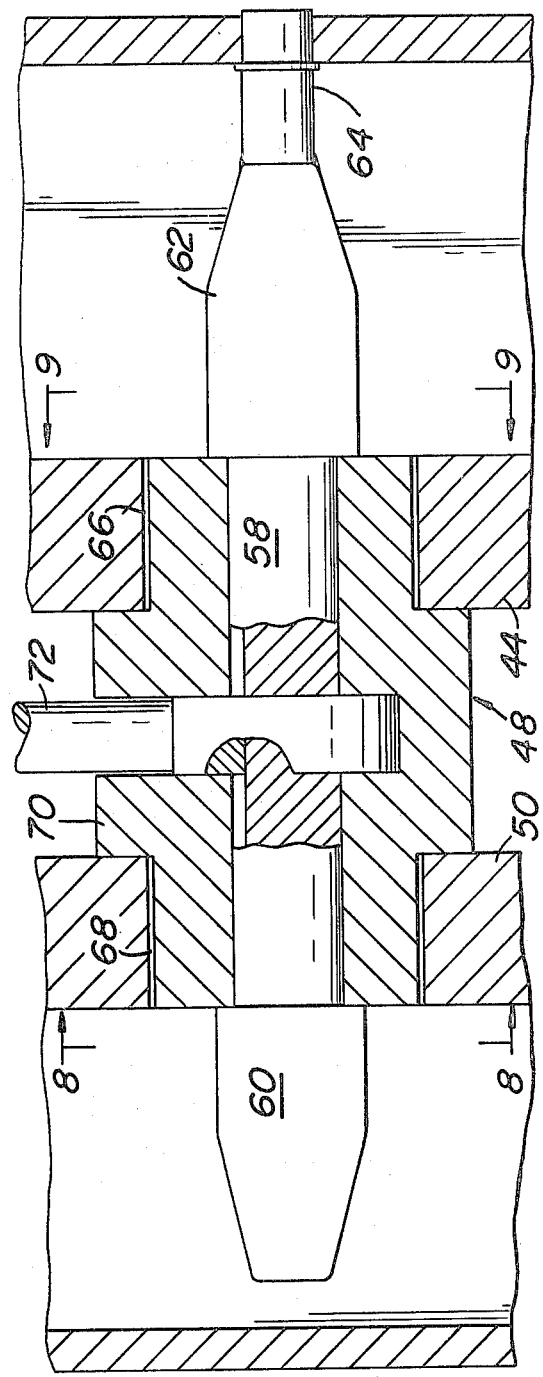
FIG. 7 is a sectional view through one of the coupler members which joins two containers horizontally.

The coupler member 48 as shown in FIG. 7 rigidly interconnects the housings 44 and 50. Coupler member 48 includes a central rod 58 integral with shaped heads 60, 62. One end 64 of the rod is rotatably supported by the rear wall of housing 44.

Figure 9:
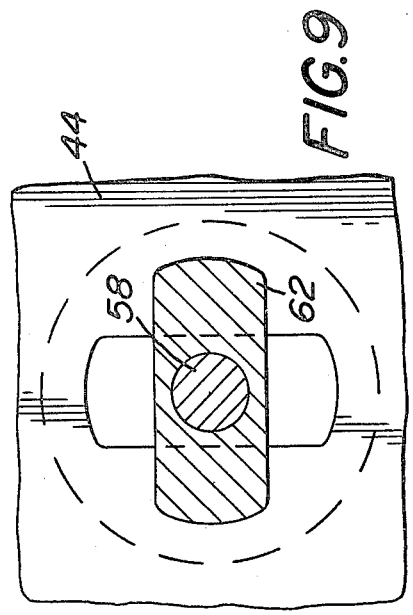
FIG. 9 is a view taken along the line 9—9 in FIG. 7.
Figure 8:
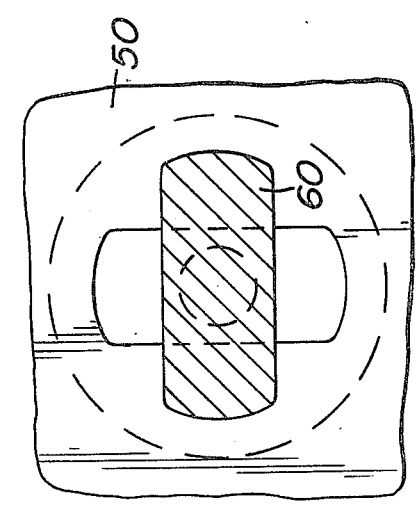
FIG. 8 is a view taken along the line 8—8 in FIG. 7.

A sleeve having shoulders 66, 68 surrounds and is pivotably assembled to the rod 58. The sleeve has a radially outwardly directed flange 70 which is disposed between the housings 46 and 52. Flange 70 has an arcuate slot within which is disposed an actuating handle 72. The inner end of handle 72 is keyed to the rod 58. When handle 72 is rotated, it moves the head 60, 62 from a position aligned with openings in the front wall of the housings 44, 50 to a position wherein the heads are within and angled as shown more clearly in FIGS. 8 and 9 to thereby overlie portions of the front wall of the housings and lock the housings together in a horizontal direction.

Figure 5:
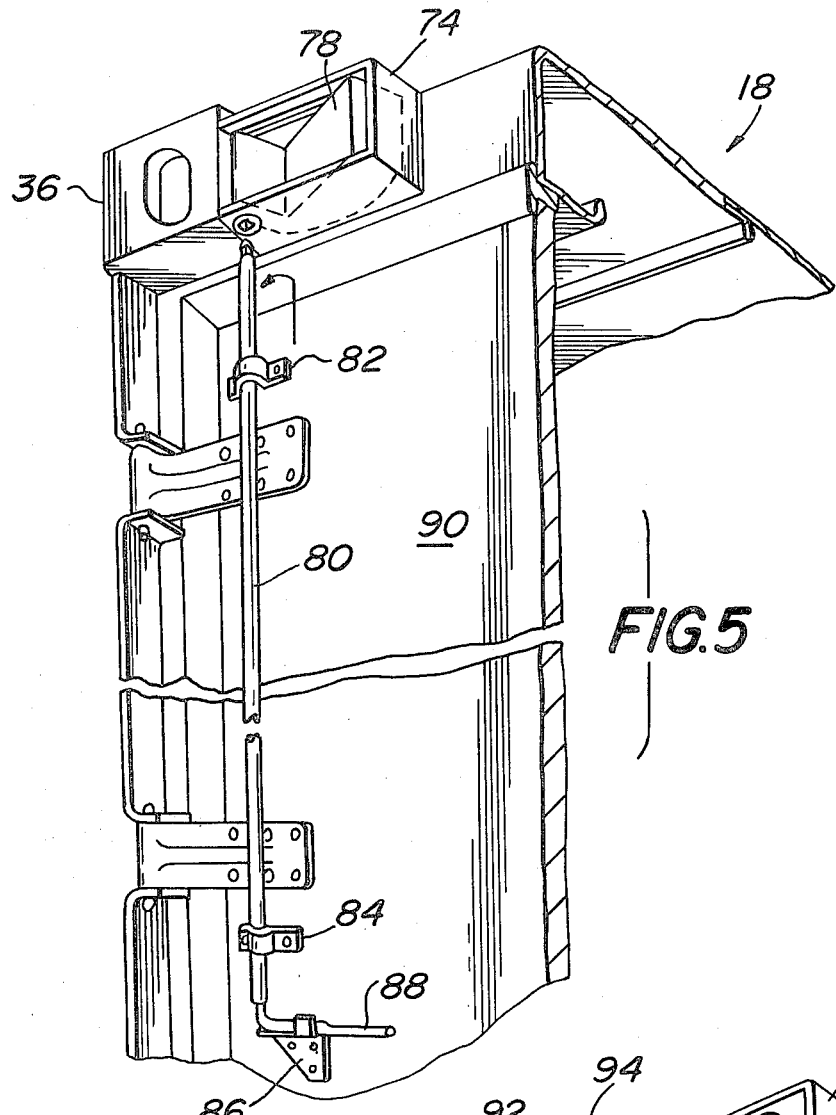
FIG. 5 is a partial perspective view of the upper corner on the container shown in FIG. 4.
Figure 6:
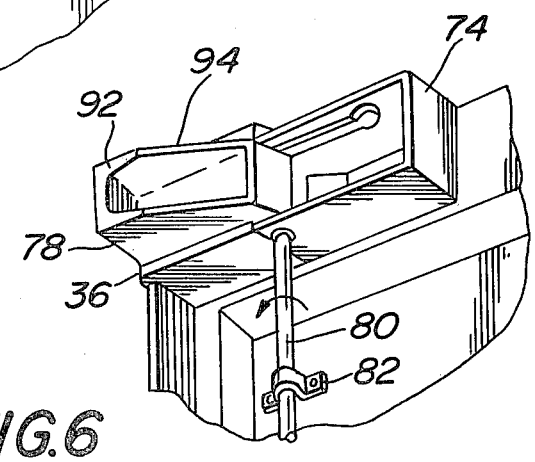
FIG. 6 is a detail of the upper corner of FIG. 5 with a spacer member in an operative position.

Referring to FIGS. 4-6, one of the containers such as container 18 has a housing 74 secured to the upper edge of the container adjacent to and flush with the corner casting 36. A similar housing 76 is provided with adjacent the upper corner casting 38. Each of the housings 74, 76 contains a spacer member in an operative position as shown in FIG. 4. Since the respective structures are identical, only the structure associated with housing 74 will be described in detail.

Referring to FIGS. 5 and 6, a spacer member 78 is pivotably supported by the housing 74 and has a retracted position within the housing 74. A control rod 80 is mounted on the rear door or the front wall 90 of the container 18 by way of brackets 82, 84 and 86. Bracket 86 supports the handle 88 at the lower end of the control rod 80. Control rod 80 at its upper end has a tip spaced from the bottom wall of housing 74 which contains a hole aligned with the tip accommodating the spacer trunnion. When the handle 88 is elevated, the tip on rod 80 enters the recess in the spacer trunnion and handle 88 clears the bracket 86. Thereafter, control rod 80 may be rotated slightly less than 180° so as to pivot the spacer member 78 from the inoperative position shown in FIG. 5 to the operative position shown in FIG. 6.

In the operative position of the spacer member 78 as shown in FIG. 6, there is presented a vertical front wall 92 for contact with the upper end portion of the container 10. Member 78 is preferably provided with a bevel 94 so as to minimize the size of housing 74 which is needed to contain the spacer member 78. The rear face of spacer member 78 overlies the front face of the upper corner casting 36 as shown more clearly in FIG. 6. Thus, it will be apparent that the system of the present invention in its preferred form does not entail any mechanical coupling of the upper corners of the containers 10 and 18 but rather contemplates a spacer member which will space the upper corners of containers 10 and 18 from one another by a dimension corresponding to the dimension defined by the axial lengthe of the flange 70.

The coupler members 48, 54 may assume a wide variety of configurations. The coupler members are preferably of the type disclosed in U.S. Pat. No. 3,261,070 which were primarily designed for use in coupling the corner castings such as corner castings 40 and 56 on the containers. The corner castings on a ISO standard container lack sufficient strength so as to enable the containers to be coupled together and lifted vertically by lifting cables 34 connected to a crane or the like. One advantage of the present invention is that it does not in any way change the structure of the ISO standard container, but adds structure thereto so that such containers may be rigidly interconnected horizontally at their lower corners and spaced from one anoter by a comparable distance at their upper ends. All components that required minipulation by personnel such as the handles 72 and the control rods 80 are readily accessible from ground level. That feature contributes toward the ability to rapidly couple the containers 10 and 18 together.

The system of the present invention is preferably utilized as follows. A latch which rigidly interconnects the chassis sections 12 and 20 is released. The tractor 32 is driven in a forward direction for a short distance such as 12 to 14 inches. This results in the chassis sections 12 and 20 moving to an extended position as shown in FIG. 1 wherein the bolsters 16 and 34 are spaced from one another. Container 10 is lowered by a crane onto the chassis section 12 and secured to the bolsters 14 and 16. A container 18 is lowered onto the chassis section 20 and secured to the bolsters 22, 24. At this point in time, the components are as shown in FIG. 1.

Coupler member 48 is inserted into housing 44. Coupler member 54 is inserted into housing 52. The spacer members are manipulated to the operative position such as the position of spacer member 78 as shown in FIG. 6. Each control rod 80 is then permitted to descend, disengage from its spacer member, and then is moved to the inoperative position as shown in FIG. 5.

The tractor 32 is driven in reverse for a short distance. Chassis section 12 is telescoped with respect to chassis section 20 and is guided by the latter so that container 10 is aligned and moves toward the container 18. The head 60 of coupler member 48 enters the opening in the front wall of the housing 50 and the head on coupler member 54 similarly enters the housing 46. The front wall of each of the housings 44, 46, 50 and 52 engage one of the end faces of the flanges on the coupler members 48, 54. Each handle 72 is minipulated so as to rotate the coupler members through an angle of approximately 90° to thereby lock the coupler members in position. The lock joining each bolster to a container is released. Thereafter, the cables 34 are coupled to the upper corner members at the ends of the composite container and lifted by a crane for stacking, for loading onto a container ship, etc. If each of the containers 10 and 18 is 19'-10½" long, the composite container will be 40 feet long. The dimension added by coupler member and spacer between containers is 3". The sequence of steps is simple, can be performed very quickly with minimum labor and requires very little skill.

When the apparatus or method of the present invention is utilized in connection with the loading of a container ship, no permanent installation is required at the dock due to the fact that the telescoping chassis sections and tractor 32 are mobile and may be driven to a parking lot when not in use. Further, the actual coupling of the containers 10 and 18 may be accomplished in one area and then driven by the tractor 32 to the area of the crane for loading onto a container ship thereby minimizing conjestion at the dock area. It should be apparent to those skilled in the art that to "split" (uncouple) a 40 ft. unit into individual 20 ft. containers, the sequence of the described proceure must be reversed.

The present invention may be embodied in other specific forms without departing from the spirit or essential attributes thereof and, accordingly, reference should be made to the appended claims, rather than to the foregoing specification, as indicating the scope of the invention.

We claim:

1. A method of joining two containers end to end for subsequent movement as a unit comprising:
    (a) providing first and second telescoping chassis sections movable between an extended position and a retracted position;
    (b) positioning a discrete container on each chassis section while the chassis sections are in an extended position;
    (c) providing each container with mating coupler structure as juxtaposed lower corners, providing at least one of said containers with a spacer member between the juxtaposed upper ends of said containers;
    (d) moving the first chassis section to a retracted position so that the container thereon moves toward the other container on the second chassis section until the upper ends of each of the containers are in engagement with the spacer member and the mating structure at the lower corners engage the coupler members, moving the spacer member from an inoperative position to an operative position before the container on the first section is moved toward the container on the second chassis section, said step of moving the spacer member includes pivoting the spacer about a vertical axis from its inoperative position to its operative position, and rigidly joining the lower corners of said containers by said mating coupler structures so that the containers may be moved as a unit.

2. A method in accordance with claim 1 wherein said method of moving the containers includes coupling lifting cables to corner members at the opposite ends of the composite containers, and lifting said cables upwardly with a crane so that the containers may be loaded into a container ship.

3. A method in accordance with claim 1 including moving the first chassis section for a distance of approximately 12–14 inches when moving from its extended position to its retracted position.

4. A method in accordance with claim 1 including moving a pair of said spacer members at the upper ends of one container between operative and inoperative positions by a tool while standing at ground level.

5. A method in accordance with claim 1 including using containers which are ISO standard intermodel containers, and providing said containers with coupler members in housing adjacent to and flush with corner fittings on each container.

* * * * *